United States Patent
Zheng et al.

(10) Patent No.: US 8,582,436 B2
(45) Date of Patent: Nov. 12, 2013

(54) RESOURCE ALLOCATION DURING SILENCE PERIOD FOR A WIRELESS NETWORK

(75) Inventors: Haihong Zheng, Coppell, TX (US); Xiaoyi Wang, Beijing (CN); Jan Suumäki, Lempäälä (FI); Shashikant Maheshwari, Irving, TX (US); Yousuf Saifullah, Richardson, TX (US)

(73) Assignee: Nokia Siemens Networks Oy, Espoo (FI)

( * ) Notice: Subject to any disclaimer, the term of this patent is extended or adjusted under 35 U.S.C. 154(b) by 176 days.

(21) Appl. No.: 13/061,351

(22) PCT Filed: Sep. 3, 2009

(86) PCT No.: PCT/US2009/055818
§ 371 (c)(1),
(2), (4) Date: Apr. 27, 2011

(87) PCT Pub. No.: WO2010/028106
PCT Pub. Date: Mar. 11, 2010

(65) Prior Publication Data
US 2011/0194538 A1    Aug. 11, 2011

Related U.S. Application Data

(60) Provisional application No. 61/094,048, filed on Sep. 3, 2008, provisional application No. 61/094,273, filed on Sep. 4, 2008.

(51) Int. Cl.
*G01R 31/08* (2006.01)
(52) U.S. Cl.
USPC .............................. 370/235; 370/328; 370/459

(58) Field of Classification Search
None
See application file for complete search history.

(56) References Cited

U.S. PATENT DOCUMENTS

| 6,456,306 B1 | 9/2002 | Chin et al. |
| 6,577,862 B1 | 6/2003 | Davidson et al. |

(Continued)

FOREIGN PATENT DOCUMENTS

| EP | 1613107 A2 | 1/2006 |
| EP | 1919160 A1 | 5/2008 |

(Continued)

OTHER PUBLICATIONS

Restriction Requirement for U.S. Appl. No. 12/192,534, mailed Apr. 7, 2011, 8 pages.

(Continued)

*Primary Examiner* — Jung Park
(74) *Attorney, Agent, or Firm* — Brake Hughes Bellermann LLP

(57) ABSTRACT

Various example embodiments are disclosed herein. According to an example embodiment, a technique may include allocating periodic resources to a mobile station in a wireless network for transmission of voice data, receiving from the mobile station an indication of a start of a silence period, and adjusting, based on the receiving of the indication of a start of silence period, the allocating of the periodic resources from a size and period of resource for the voice data to a size and period of resource for a silence indication (SID) frame. Alternatively, in response to receiving an indication of a start of silence period, the allocating of periodic resources for the VoIP voice data may be temporarily stopped during the silence period.

10 Claims, 11 Drawing Sheets

(56) References Cited

U.S. PATENT DOCUMENTS

| | | | |
|---|---|---|---|
| 7,617,073 | B2 | 11/2009 | Trinon et al. |
| 8,040,854 | B2 | 10/2011 | Furueda et al. |
| 8,284,707 | B2 * | 10/2012 | Choi et al. .................... 370/311 |
| 8,412,287 | B2 | 4/2013 | Qi et al. |
| 2005/0232135 | A1 | 10/2005 | Mukai et al. |
| 2007/0242786 | A1 | 10/2007 | Kim et al. |
| 2008/0101286 | A1 | 5/2008 | Wang et al. |
| 2008/0107056 | A1 | 5/2008 | Choi et al. |
| 2008/0125048 | A1 | 5/2008 | Pi |
| 2008/0139212 | A1 | 6/2008 | Chen et al. |
| 2009/0010243 | A1 * | 1/2009 | Hiddink .................... 370/346 |
| 2009/0052381 | A1 | 2/2009 | Gorokhov et al. |
| 2009/0075667 | A1 * | 3/2009 | Bourlas .................... 455/452.1 |
| 2009/0304098 | A1 | 12/2009 | Chun et al. |
| 2010/0041445 | A1 | 2/2010 | Qi et al. |
| 2010/0061327 | A1 | 3/2010 | Qi et al. |
| 2011/0075628 | A1 * | 3/2011 | Cho et al. .................... 370/329 |

FOREIGN PATENT DOCUMENTS

| | | |
|---|---|---|
| WO | 2006/040769 A1 | 4/2006 |
| WO | 2007/127945 A2 | 11/2007 |
| WO | 2010/028106 A2 | 3/2010 |
| WO | 2010/028106 A3 | 5/2010 |
| WO | 2010/115823 A2 | 10/2010 |
| WO | 2010/115823 A3 | 10/2010 |

OTHER PUBLICATIONS

International Preliminary Report on Patentability and Written Opinion for International Application No. PCT/US2009/055818, mailed Mar. 17, 2011, 12 pages.

Restriction Requirement Response for U.S. Appl. No. 12/192,534, filed on Apr. 28, 2011, 3 pages.

Notice of Allowance received for U.S. Appl. No. 12/553,644, mailed on Nov. 25, 2011, 15 pages.

Non-Final Office Action Response filed for U.S. Appl. No. 12/192,534, filed on Dec. 2, 2011, 14 pages.

"Part 11: Wireless LAN Medium Access Control (MAC) and Physical Layer (PHY) Specifications", IEEE Standard for Information Technology—Telecommunications and information exchange between systems—Local and metropolitan area networks—Specific requirements, IEEE Std. 802.11-2007, Jun. 12, 2007, 1231 pages.

Jung, Woo, et al., "Adaptive sleep mode algorithm in IEEE 802.16e", Proceedings of Asia-Pacific Conference on Communications 2007, Oct. 1, 2007, pp. 483-486.

U.S. Appl. No. 12/192,534 Notice of Allowance mailed Nov. 23, 2012, 17 pages.

"3rd Generation Partnership Project; Technical Specification Group Radio Access Network; Evolved Universal Terrestrial Radio Access (E-UTRA), Medium Access Control (MAC) protocol specification (Release 8)", 3GPP TS 36.321 V8.2.0, May 2008, 33 pages.

Bourlas, et al., "Persistent Allocation", IEEE 802.16 Broadband Wireless Access Working Group, IEEE C802.16maint-08/095r4, Mar. 17, 2008, pp. 1-44.

Cudak, Mark, "IEEE 802.16m System Requirements", Motorola, IEEE 802.16 Broadband Wireless Access Working Group, Oct. 19, 2007, pp. 1-26.

Fong, et al., "Persistent Assignment for VoIP Support", IEEE 802.16 Broadband Wireless Access Working Group, Nov. 4, 2007, pp. 1-4.

Gupta, Maruti, et al., "Proposal for IEEE 802.16m Sleep Mode Operation", IEEE 802.16 Broadband Wireless Access Working Group, IEEE C802.16m-08/703r3, Jul. 16, 2008, pp. 1-18.

Hamiti, Shkumbin, "The Draft IEEE 802.16m System Description Document", Nokia, IEEE 802.16 Broadband Wireless Access Working Group, IEEE 802.16m-08/003R4, Jul. 29, 2008, 89 pages.

IEEE, "Part 16: Air Interface for Broadband Wireless Access Systems", IEEE WirelessMAN 802.16, Draft Standard for Local and metropolitan area networks, LAN/MAN Standards Committee of the IEEE Computer Society, IEEE Microwave Theory and Techniques Society, Revision of IEEE Std 802.16-2004, P802.16Rev2/D5, Jun. 2008, 2040 pages.

IEEE, "Part 16: Air Interface for Fixed and Mobile Broadband Wireless Access Systems", Amendment 2: Physical and Medium Access Control Layers for Combined Fixed and Mobile Operation in Licensed Bands and Corrigendum 1, IEEE Computer Society and the IEEE Microwave Theory and Techniques Society, IEEE Std. 802.16e 2005, Feb. 28, 2006, 864 pages.

So, "Performance Analysis of Uplink Scheduling Algorithms for VoIP Services in the IEEE 802.16e OFDMA System", Wireless Personal Communications, vol. 47, No. 2, XP019617261, ISSN: 1572-834X Paragraphs 2.4, 3.1, Feb. 9, 2008, pp. 247-263.

Jin, et al., "Power Saving Strategies in IEEE 802.16m", IEEE 802.16 Broadband Wireless Access Working Group, IEEE C802.16m-08/756r2, Jul. 7, 2008, pp. 1-6.

Kang, et al., "IEEE 802.16 Presentation Submission Template (Rev. 9)", NSN & Nokia, Proposal for IEEE 802.16m Uplink Physical Resource Allocation Unit in Green-field, IEEE C802.16m-08/xxx, May 5, 2008, 13 pages.

Kone, et al., "Sleep Mode Considerations for a Device-Based Power Saving", ITRI, IEEE 802.16 Broadband Wireless Access Working Group, Jul. 7, 2008, pp. 1-12.

McBeath, et al., "New enhancements in WiMAX", Leading Edge, Issue 41, Jun. 2008, pp. 46-48.

International Search Report and Written Opinion for International Application No. PCT/US2009/055818, mailed on Apr. 13, 2010, 20 pages.

Qi, et al., "Considerations on 802.16m Sleep mode", IEEE 802.16 Broadband Wireless Access Working Group, IEEE C802.16m-08/719, Jul. 7, 2008, pp. 1-5.

Ren, et al., "Adaptive DRX Scheme for Optimal Power Saving", IEEE 802.16 Broadband Wireless Access Working Group, IEEE C802.16m-08/036, Jan. 16, 2008, pp. 1-6.

Son, et al., "Sleep mode operation for IEEE802.16m", C802.16m-08/721r1, Jul. 7, 2008, pp. 1-10.

Non-Final Office Action for U.S. Appl. No. 12/192,534, mailed on Apr. 13, 2012, 20 pages.

Non-Final Office Action for U.S. Appl. No. 12/192,534, mailed on Jun. 2, 2011, 17 pages.

International Preliminary Report on Patentability dated Oct. 20, 2011, for International Application No. PCT/EP2010/054357, 15 pages.

International Search Report and Written Opinion dated Oct. 4, 2010, for International Application No. PCT/EP2010/054357, 20 pages.

U.S. Office Action for U.S. Appl. No. 131263,299 dated Aug. 7, 2013 (9 pages).

* cited by examiner

RESOURCE ALLOCATION DURING SILENCE PERIOD FOR A WIRELESS NETWORK

CROSS-REFERENCE TO RELATED APPLICATIONS

This application is a national stage entry of PCT Application No. PCT/US2009/055818, filed on Sep. 3, 2009, entitled "Resource Allocation During Silence Period For A Wireless Network," which, in turn, claims the benefit of priority based on U.S. Provisional Application No. 61/094,048, filed on Sep. 3, 2008 and entitled "Resource Allocation During Silence Period For A Wireless Network," and U.S. Provisional Patent Application No. 61/094,273, filed on Sep. 4, 2008 and entitled "Resource Allocation During Silence Period For A Wireless Network," all of which are incorporated by reference herein.

TECHNICAL FIELD

This description relates to wireless networks.

BACKGROUND

Voice over IP (VoIP), as an example, is being supported by some new or emerging wireless networks. During a VoIP or voice call (or VoIP session), a voice Codec may typically generate voice data or voice packets to be transmitted across the network (e.g., via a base station or other infrastructure node) to another station or VoIP endpoint during an active (or listen) period for the mobile station. In some cases, silence indication (SID) frames may be transmitted by a mobile station during a silence period to allow for comfort noise to be generated at the receiving station. Also, other types of voice transmissions, other than VoIP, may also transmit voice data, and transmit a silence indication during a silence period.

SUMMARY

According to an example embodiment, a method may include allocating periodic resources to a mobile station in a wireless network, receiving an indication of a start of a silence period from the mobile station, and temporarily stopping the allocating of the periodic resources to the mobile station based on the receiving the an indication of a start of a silence period.

According to another example embodiment, an apparatus may include a controller, and a wireless transceiver. The apparatus may be configured to: allocate periodic resources to a mobile station in a wireless network, receive an indication of a start of a silence period from the mobile station, and temporarily stop allocating of the periodic resources to the mobile station based on receipt of the indication of a start of the silence period.

According to another example embodiment, an apparatus may include a controller, and a wireless transceiver. The apparatus may be configured to: allocate periodic resources to a mobile station in a wireless network for the transmission of voice data (e.g., VoIP voice data); receive an indication of a start of a silence period from a mobile station; temporarily stop allocating of the periodic resources to the mobile station based on the receipt of the indication of the start of the silence period; receive an indication of an end of the silence period from the mobile station; and restart the allocating of the periodic resources to the mobile station based on receipt of the indication of the end of the silence period.

According to an example embodiment, a technique may include allocating periodic resources to a mobile station in a wireless network for transmission of voice data, receiving from the mobile station an indication of a start of a silence period, and adjusting, based on the receiving of the indication of a start of silence period, the allocating of the periodic resources from a size and period of resource for the voice data to a size and period of resource for a silence indication (SID) frame. In an example embodiment, the size and period of the SID frame may be received from the mobile station, e.g., via a Dynamic Service Addition (DSA) or Dynamic Service Change (DSC) procedure or other signaling.

According to another example embodiment, a method may include providing a persistent resource allocation to a mobile station in a wireless network for transmission of voice data, receiving from the mobile station an indication of a start of a silence period, and adjusting, based on the receiving of the indication of a start of silence period, the persistent resource allocation from a size and period of resource for the voice data to a size and period of resource for a silence indication (SID) frame. In an example embodiment, the size and period of the SID frame may be received from the mobile station, e.g., via a Dynamic Service Addition (DSA) or Dynamic Service Change (DSC) procedure or other signaling.

According to another example embodiment, an apparatus may include a controller, and a wireless transceiver. The apparatus may be configured to: provide a persistent resource allocation to a mobile station in a wireless network for transmission of voice data; receive from the mobile station an indication of a start of a silence period; and adjust, based on the receiving of the indication of a start of silence period, the persistent resource allocation from a size and period of resource for the voice data to a size and period of resource for a silence indication (SID) frame. According to an example embodiment, the apparatus may be further configured to: receive from the mobile station an indication of an end of the silence period; and re-adjust, based on the receiving of the indication of the end of the silence period, the persistent resource allocation from the size and period of resource for the silence indication (SID) frame to the size and period of resource for the voice data.

According to another example embodiment, a method may include determining an overlap of an uplink silence period and a downlink silence period (which may be referred to as a mutual silence period) for a mobile station, and increasing a sleep window from a normal sleep window to an extended sleep window for the mobile station in response to determining the overlap of uplink and downlink silence periods.

The details of one or more implementations are set forth in the accompanying drawings and the description below. Other features will be apparent from the description and drawings, and from the claims.

DETAILED DESCRIPTION

Figure 1:
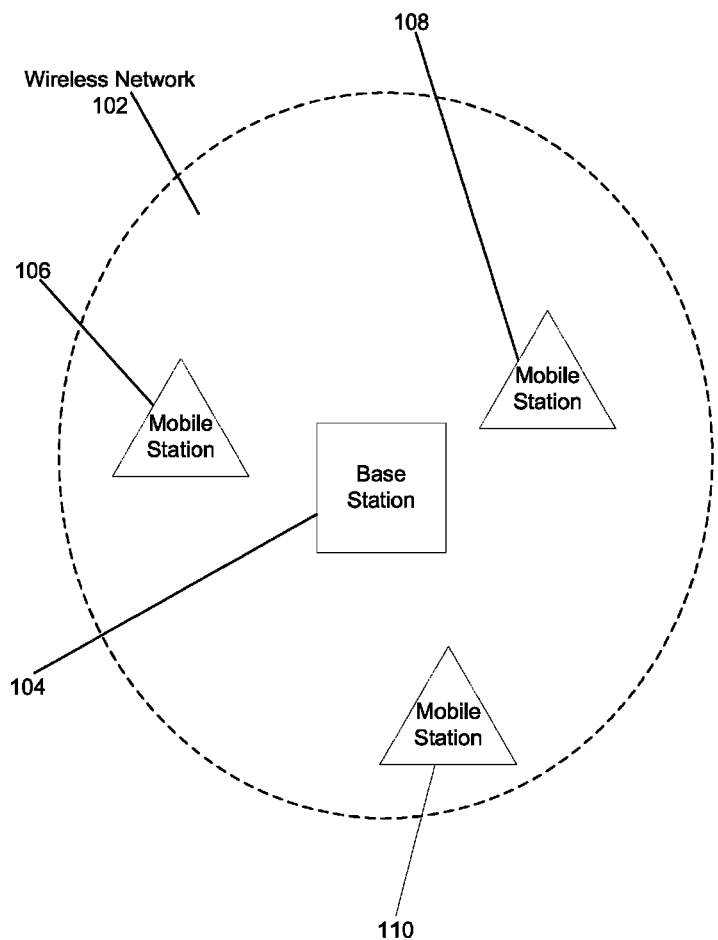
FIG. 1 is a block diagram of a wireless network according to an example embodiment.

FIG. 1 is a block diagram of a wireless network 102 including a base station 104 and three mobile stations 106, 108, 110 according to an example embodiment. Although not shown, mobile stations 106, 108 and 110 may be coupled to base station 104 via relay stations or relay nodes, for example. The wireless network 102 may include, for example, an IEEE 802.16 Wireless Metropolitan Area Network (WiMAX), an IEEE 802.11 Wireless Local Area Network (WLAN), or a cellular telephone network, according to example embodiments. The base station 104 may include a cellular or WiMAX base station (BS), a node B, an 802.11 access point, or other infrastructure node, according to various example embodiments. The term "base station" (BS) may be used herein and may include any type of infrastructure node. The mobile stations 106, 108, 110 may include laptop or notebook computers, smartphones, personal digital assistants (PDAs), cellular telephones, WiMAX device, subscriber station, or any other wireless device, according to example embodiments. The term "wireless node" may include any type of wireless node, such as base stations, mobile stations, etc. While the present disclosure may use some of the terminology of WiMAX or other wireless standards, aspects of the present disclosure may be applicable to any networking or wireless technologies.

Figure 2:
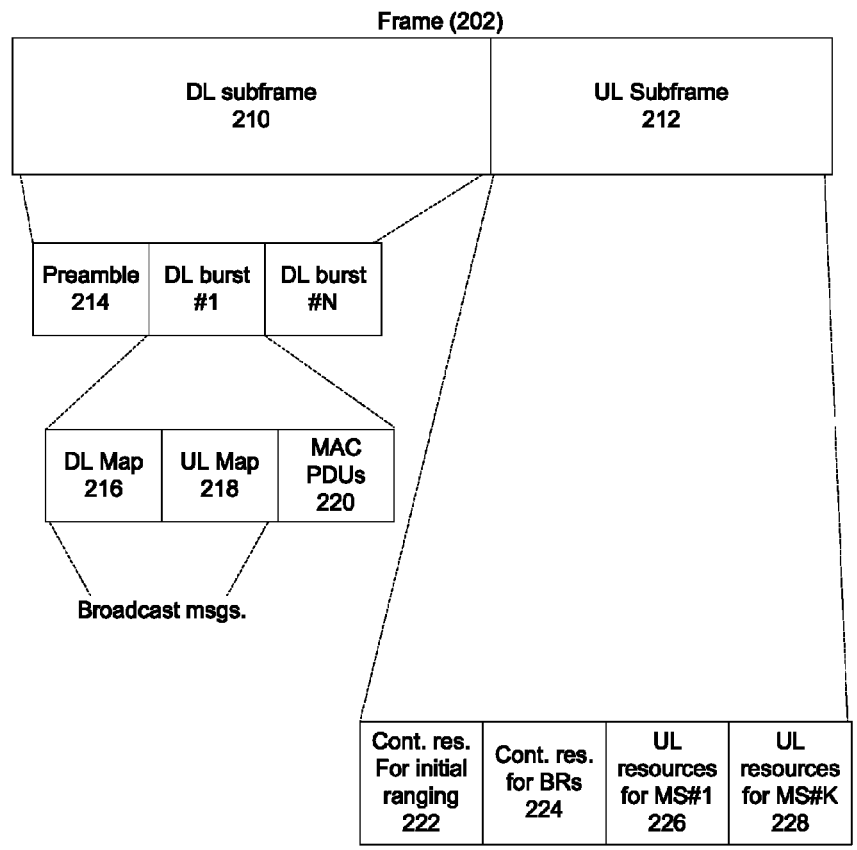
FIG. 2 is a diagram illustrating an example embodiment of a frame that may be used according to an example embodiment.

FIG. 2 is a diagram illustrating a frame according to an example embodiment. The example frame 202 may include a downlink (DL) subframe 210 and an uplink (UL) subframe). The DL direction may include signals transmitted from the BS 104 to mobile stations (or mobile nodes) 106, 108 and 110. While the UL direction may include signals transmitted from mobile stations 106, 108 or 110 to BS 104.

The DL subframe 210 illustrated in FIG. 2 is an example DL subframe, and may include a number of fields, some of which are shown in FIG. 2. The DL subframe 210 may include a preamble 214, and one or more DL data bursts, such as DL burst #1, DL burst #2, ... DL burst #N. DL burst #1 may include a Map message that may include some scheduling information for one or more data bursts. DL burst #1 may include a DL Map 216 that provides DL burst scheduling information, and an UL Map 218 that may provide UL scheduling information (or identify the scheduled UL resources for the current subframe or for a subsequent subframe). The DL Map 216 and the UL Map 218 are part of the broadcast information or broadcast messages transmitted by BS 104, for example. A Map message, transmitted by a BS 104 (FIG. 1) to one or more mobile stations, may include the DL Map 216, the UL Map 218, and/or other information, to provide scheduling and resource information for DL and UL transmissions. The DL Map 216 and the UL Map 218 may be transmitted via one or more information elements (IEs) within a Map message, for example. For example, each Map IE may allocate resources to a MS or connection ID (CID), e.g., by specifying the allocated resources and the CID or MS for which the resources are allocated. Additional MAC PDUs 220 (protocol data units) may also be provided in the DL subframe 210.

UL subframe 212 illustrates some fields of an example UL subframe, and may include, for example, UL contention resources for initial ranging 222, UL contention resources for bandwidth requests 224 (e.g., to allow MSs to make requests for bandwidth or UL resources), and then UL resources allocated to one or more mobile stations, e.g., UL resources for MS#1 226, ... UL resources for MS#K 228. Other fields may be provided in DL subframe 210 and/or UL subframe 212. Frame 202 is merely an example frame format, and a wide variety of frame formats may be used.

Some types of applications, such as Voice over Internet Protocol (Voice over IP or VoIP) applications or devices, may transmit or receive a substantially predictable amount of traffic over a recurring interval or period of time (but possibly with some amount of variation). For example, a VoIP application or device may generate and/or receive a substantially predictable amount of traffic every 20 ms (e.g., every 4 frames, if the frame is 5 ms). Other types of voice transmissions may also generate predictable or substantially periodic traffic. VoIP (and VoIP voice data), as described herein, is provided merely as an example, and the disclosure is not limited to VoIP. The various embodiments may be applied to a wide variety of applications and network types.

According to an example embodiment, there are different techniques that a base station may use to allocate periodic resources to a mobile station (or to a connection ID associated with a VoIP application, or other voice-related application, running on the mobile station). For example, a BS may periodically allocate resources to a MS by transmitting a Map IE to allocate uplink (UL) resources to the MS in the same frame or in a subsequent frame. The Map IE may be transmitted by the BS to the MS every X frames (e.g., every 4 frames) to allocate UL resources for the mobile station to transmit voice data (e.g., VoIP voice data) to the BS every X frames. For example, where a period of 4 frames is used for VoIP voice traffic for a MS, a BS may transmit a Map IE in frame 1 to identify UL resources allocated to the MS in frame 2 (e.g., for the transmission of VoIP voice data), may transmit a Map IE in frame 5 to identify UL resources allocated to the MS in frame 6, may transmit a Map IE in frame 9 to identify UL resources allocated to the MS in frame 10, etc. In this manner, a BS may allocate UL resources to the MS at a recurring period or interval (e.g., every 4 frames) to allow the MS to transmit voice data to the BS. The BS may then forward the received voice data to a second station (which may be a wireless station or a wired station or device). The MS and the second station may be associated with a VoIP connection (or other connection), or in other words, may be considered end points in a VoIP or other connection (a VoIP connection or other connection may be established between the two stations).

Alternatively, the BS may provide a persistent resource allocation to the mobile station that allocates a recurring periodic resource to the MS for the transmission of VoIP voice data. For example, a BS may transmit a persistent IE to identify the recurring periodic resources (e.g., including period and length of resources) that are allocated to the MS. Thus, overhead may be decreased for a persistent allocation (as compared to a standard resource allocation using Map IE described above), since for a persistent allocation, a single persistent IE may be sent to notify the MS of the persistent or recurring resources to be allocated to the MS, rather than the BS transmitting a Map IE to separately identify the UL allocation for each frame. An example embodiment of a persistent resource allocation is described in greater detail with respect to FIG. 3. Regardless of the technique to allocate periodic resources, the period and size of the allocation may be determined, for example, by (or based on) the voice Codec (coder-decoder) that is used by the voice application (e.g., VoIP application) or device at the mobile station or device. This is because, for example, different Codec's may generate different amounts of voice data and at different rates. Thus, the size and period of the periodic (or recurring) resource allocation required by a voice application or VoIP application to transmit voice data may vary based on the characteristics of the voice Codec, for example.

Figure 3:
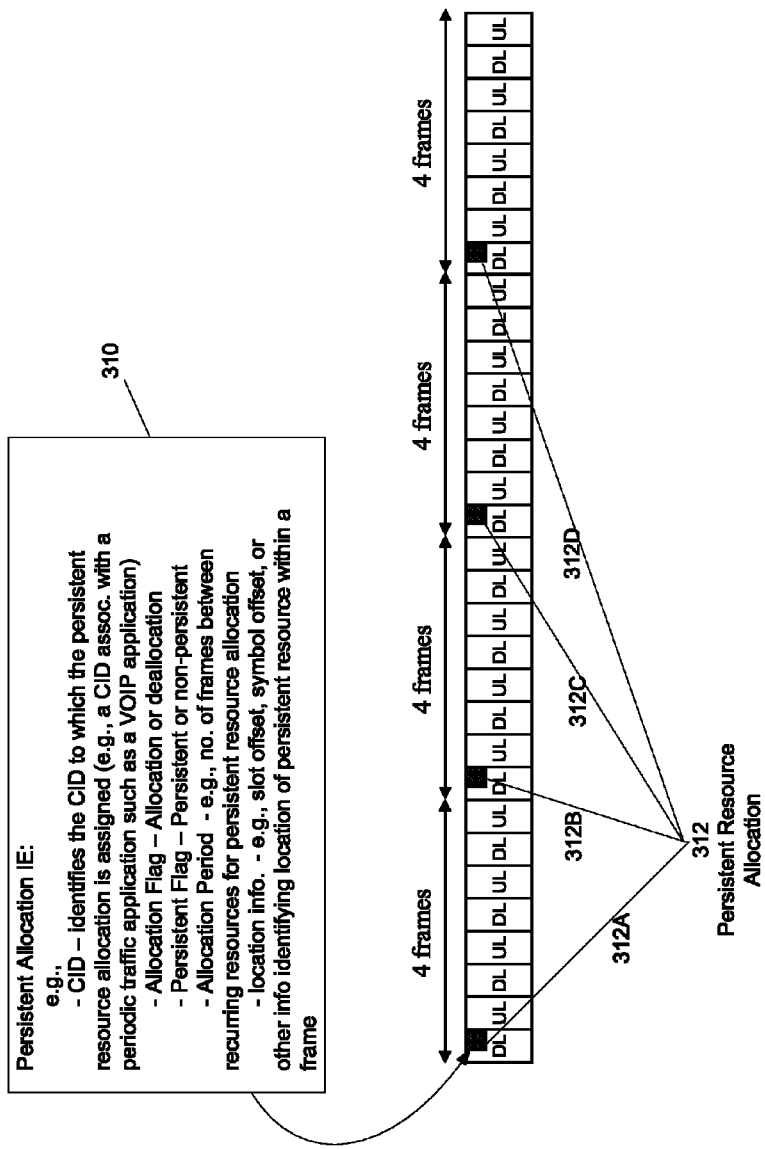
FIG. 3 is a diagram illustrating a persistent resource allocation according to an example embodiment.

FIG. 3 is a diagram illustrating a persistent resource allocation according to an example embodiment. According to an example embodiment, a BS may assign a persistent resource allocation 312 to a MS or to a connection identifier (CID) by sending a persistent allocation IE 310 (which may also be referred to as a persistent Map IE or simply as persistent IE). The persistent resource allocation may be assigned or allocated to a MS or CID, with a specified recurring period. The persistent resource allocation (e.g., its location in a frame, number of symbols) and the associated MCS (modulation rate and coding scheme) for the persistent resource may be fixed until the persistent resource allocation is deallocated when the BS sends another persistent allocation IE indicating deallocation. Thus, for traffic that may be transmitted or received periodically or predictably, it is not necessary to send a burst assignment (or resource allocation) for every frame. Rather, a persistent allocation IE 310 may be used to assign a persistent resource allocation (e.g., which may include a periodically recurring resource assigned to a MS or CID), which may continue until the BS deallocates the persistent resource allocation.

Referring to FIG. 3, a persistent allocation IE 310 may be sent by a BS to allocate a persistent resource allocation 312 to a MS or CID (connection identifier). The persistent resource allocation 312 may include resources in each of multiple frames, such as providing a periodically recurring resource (e.g., a burst or resource every frame, every two frames, every three frames, every four frames, or other period). The persistent resource allocation 312 may include periodically recurring resources, such as resources 312A, 312B, 312C, 312D, etc. Although the persistent resource allocation 312 is shown for DL resources, a persistent resource allocation may also be provided for UL resources. The resources 312A, 312B, 312C and 312D are provided every 4 frames (e.g., a burst or group of symbols every 20 ms, if each frame is 5 ms. For example, an application (such as a VOIP application, for example) provided at the MS may either generate or receive periodic traffic (e.g., a predictable amount of traffic over a period of time, possibly with some amount of variation). Thus, the BS may assign a persistent resource allocation to the CID associated with the VOIP application (or to the MS), and this persistent resource allocation may continue until the BS sends another persistent allocation IE indicating deallocation of the persistent resource.

As shown in FIG. 3, an example of a persistent allocation 310 is shown, and may include one or more fields, such as, for example: a CID—which may identify the CID or MS to which the persistent resource allocation (or deallocation) is assigned; an allocation flag—indicating allocation or deallocation; persistent flag—indicates a persistent or non-persistent allocation; allocation period, e.g., the number of frames between recurring resources for the persistent resource allocation; location information, e.g., slot offset, symbol offset or other information that may identify the location of each recurring resource in each frame for the persistent resource allocation; and length—which may identify a length (e.g., number of symbols) of each recurring resource of the persistent resource allocation. These are merely some example fields, and other fields may be included.

Parties to a voice communication, such as a VoIP call, may typically produce sound (or "talk") only a portion of the time, e.g., about 40-60% of the time they are occupying the communication channel, and provide silence during the remaining 40-60% of the time. However, true silence, or absence of substantially any noise, heard by a party to the call may often be misinterpreted as a dropped connection or interruption with the call. Therefore, comfort noise may be generated and provided to a party of a call during silence periods to reassure the party or listener that the call or connection still exists. Also, according to an example embodiment, rather than continuously generating, coding and transmitting the comfort noise via voice data (which may use significant resources), a mobile station or BS may transmit a silence indication (SID) frame to the other mobile station of a call (e.g., other VoIP application or call/VoIP endpoint) that may describe the qualities or characteristics of the comfort noise to be generated by the receiving MS. Based on the SID frame, the receiving VoIP/call or voice application or device may then generate and output the comfort noise to the party on the call. The SID frame may include, for example, a sample of the comfort noise or information describing the comfort noise, e.g., its volume or amplitude, it length in time (seconds) to be generated, etc. This merely describes an example SID frame, and any number of different SID frames or formats may be used.

According to an example embodiment, a VoIP call may include a unidirectional connection between each station (e.g., each MS) of the VoIP call and the BS. The two MS's of the call may be considered as VoIP endpoints. Thus, the VoIP call may include, for example, four connections (e.g., UL and DL connections from each station), each identified by a connection ID (CID). A service flow may be a unidirectional flow of packets with a particular set of QoS (quality of service) parameters, and may be identified by a service flow identifier or SFID. The BS may maintain the correspondence or association between the CIDs and the SFID(s) for a VoIP call. The QoS parameters may include, for example, traffic priority, maximum sustained traffic rate, maximum burst rate, maximum delay, data size, bandwidth request mechanism used, and/or other parameters. A service flow may be created, for example, through various types of signaling, such as by a dynamic service addition (DSA) procedure between a MS and BS, which may occur during service flow setup between the MS and BS. The MS may notify the BS of the size and period of the SID frame via a DSA procedure, or may notify the BS of a change to the size and/or period of the SID frame via a Dynamic Service Change (DSC) procedure between a MS and BS, as examples. These procedures, and similar add or change procedures, may be referred to as dynamic service (s) procedures. The MS may also notify the BS of a size and period of the VoIP voice data to be transmitted via signaling, such as, for example, a DSA procedure or the DSC procedure, or other signaling. DSA and DSC procedures are merely provided as examples by which the MS may communicate parameters (e.g., size and period) of the VoIP voice data and/or the parameters (e.g., size and/or period) of the SID frame. Other types of signaling may also be used to communicate parameters regarding SID frame and/or the VoIP voice data to be transmitted. A connection may be, for example, a unidirectional link, and may be identified by a connection ID. Thus, a VoIP call (or VoIP session between two VoIP endpoints or MSs) may include a number of unidirectional connections or CIDs, and may be associated with one or more SFIDs that may describe QoS parameters for the VoIP call, for example.

According to an example embodiment, a MS may indicate a BS of a size and period of a requested resource to transmit VoIP voice data. The size and period of the UL resource for voice data may be fixed or may be variable (over a period of time). As noted above, the size and period of UL resource requested by a MS or VoIP application may be determined based on the characteristics of the voice Codec used by the MS or VoIP application, for example. Thus, the MS may notify the BS of a required or requested size and period of the recurring or periodic resource to transmit VoIP voice data via a DSA (dynamic services addition) procedure or other signaling, for example. For example, the MS may request uplink resources to transmit VoIP voice data that includes 7 symbols provided every 4 frames (e.g., every 20 ms). The BS may then allocate periodic resources to the MS, e.g., to fulfill this resource request. The BS may allocate UL resources for the MS to transmit VoIP voice data, for example, by transmitting one or more Map IEs (allocating UL resources for a frame) via eRTPS, or by transmitting a persistent IE to provide a persistent resource allocation to the MS for the VoIP voice data.

Similarly, a MS or VoIP application (or other voice-related application) may specify a size and period of UL resources requested to transmit a SID frame. A SID frame may have, for example, a fixed sized (or a variable size), and a fixed or variable period. A MS may specify the size and period of resources requested for transmission of the SID frame via a DSA procedure or other signaling, for example. The BS may allocate the requested periodic resources for the SID frame, via eRTPS or via persistent allocation, for example.

According to an example embodiment, in order to signal or indicate a beginning and end of a silence period for the uplink or downlink direction, dedicated or separate codewords (or signals), such as dedicated CQICH codewords may be used. When a BS receives from the MS an indication of a beginning of a silence period, the BS may temporarily deactivate the allocation of resources, e.g., may temporarily deactivate the persistent allocation, since the MS will typically not need the UL voice data resources during its silence period because the MS will typically not transmit voice data during a silence period, for example. By temporarily stopping the allocating of periodic resources to the MS during the silence period, this may allow the BS to conserve unused resources, and may allow the BS to allocate such unused resources for other purpose or to other station while MS 106 is in a silence period, for example. When the BS receives from the MS an indication of the end of the silence period, the BS may reactivate the allocation of periodic resources, e.g., may reactivate the persistent allocation. Further examples or example details of this example embodiment are described with reference to FIG. 4.

Figure 4:
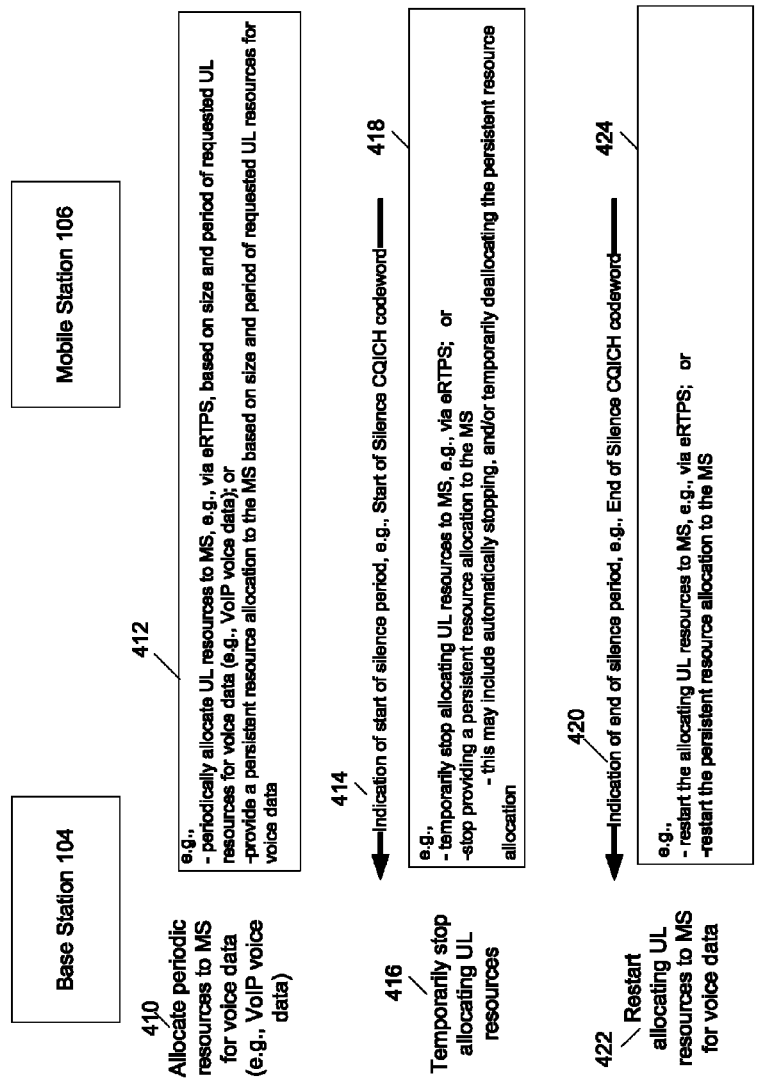
FIG. 4 is a timing diagram illustrating operation according to an example embodiment.

FIG. 4 is a timing diagram illustrating operation according to an example embodiment. Although not shown in FIG. 4, the MS 106 may request UL resources for transmission of voice data (e.g., VoIP voice data), e.g., by specifying a size and period of requested resources via a DSA procedure or other signaling.

At 410, base station (BS) 104 may allocate periodic resources to a mobile station (MS) 106 in a wireless network. As shown in operation 412, operation 410 may include, for example, periodically allocating, via extended real-time polling service (eRTPS) or other service, uplink resources to the MS for the transmission of VoIP voice data based on the size (or length) and period of the requested uplink resources. This may include, for example, the BS periodically transmitting a Map IE to allocate resources in a frame to the MS for transmission voice data. Alternatively, operation 412 may include providing a persistent resource allocation to the MS 106 that allocates recurring periodic resources to the MS for the transmission of the voice data. This may include the BS transmitting a persistent IE, specifying allocation, specifying persistent, and identify the size and period of the allocation.

At 414, the BS 104 receives from the MS 106 a start of silence period indication, such as, for example, a start of silence channel quality information channel (CQICH) codeword. This start of silence CQICH codeword indicates that a silence period has started for the MS 106 where the MS 106 will not be transmitting voice data.

At 416, the BS 104 temporarily stops allocating of the periodic resources to the MS 106 to transmit voice data (e.g., VoIP voice data) based on receipt of the start of silence indication at 414. Thus, for example, the BS may stop allocating the periodic resources for the VoIP voice data during the MS's silence period (where the start of the silence period is indicated by the, e.g., start of silence CQICH codeword). This is because, for example, such UL resources for voice data are not needed during the silence period (where the MS does not transmit voice data).

At 418, operation 416 (temporarily stopping the allocating of periodic resources) may include, for example, stopping the allocating of UL resources via, e.g., eRTPS, or stop providing a persistent resource allocation to the MS. Regarding the stopping of providing the persistent resource allocation, this may be performed by the BS automatically stopping to allocate resources of the persistent allocation (e.g., without sending signaling to the MS), or by, in another example embodiment, sending a persistent IE to the MS that indicates deallocation to (at least temporarily) deallocate the allocated UL resources.

At 420, the BS 104 may receive from the MS 106 an end of silence period indication, such as an end of silence CQICH codeword that indicates that the silence period for the MS 106 has ended, and thus, the MS may transmit voice data now. The channel quality information channel may, for example, provide a dedicated control channel that may allow a MS to report channel quality information (e.g., CINR or other channel quality), request UL resources, etc. Different CQICH codewords may be transmitted by the MS to the BS via the CQICH channel. According to an example embodiment, two additional CQICH codewords may be provided, or may be transmitted by a MS to the BS, including: a start of silence CQICH codeword that may indicate a start of silence period for the MS, and an end of silence CQICH codeword that may indicate an end of the silence period for the MS.

At 422, the BS 104 may restart allocating the UL periodic resources to the MS for the transmission of voice data, e.g., in response to receiving the end of silence CQICH codeword at 420. At 424, operation 422 may include, for example, restarting to transmit Map IEs to allocate UL resources in a frame, e.g., via eRTPS, or by restarting the persistent resource allocation. Restarting the persistent allocation may include simply restarting the allocation of recurring resources that are part of the persistent allocation, e.g., in one example embodiment, without notifying the MS of this restarting. Or, restarting the persistent allocation may include the BS resending the persistent IE that re-allocates the recurring resources, which may be been previously deallocated (or allocates similar or resources, not necessarily the identical resources that were previously allocated in a persistent IE).

According to another example embodiment, a mobile station or device or VoIP application may include a Codec that supports a periodic SID, e.g., the periodic transmission of a SID frame during a silence period. To allow the MS to transmit the periodic SID frame, for example, the BS may periodically allocate UL resources to the MS during a silence period for the MS based on period (or periodicity) of the SID frame. In an example embodiment, this may be accomplished by varying (or changing) the period of UL resource grants and the size of the grant, which may be provided via transmission of Map IEs, such that the interval or period between the UL grants or allocations and indicated resource grant sizes matches (or accommodates) the size and period of the SID frame. This may be performed as part of an extended real time polling service (eRTPS), for example.

Alternatively, the persistent resource allocation may be modified from a size and period of resource for transmission of a voice data, to a size and period for the transmission of the SID frame, and the BS may signal this change to the BS by transmitting an updated persistent IE that includes the new resource size and period for the SID frame.

In order for the BS to schedule UL resources for the SID frame correctly (e.g., to schedule or allocate UL resources having a size and period that matches or will accommodate the size and period of the SID frame), the MS may use signaling to inform the BS of the size and period of the SID frame. For example, the MS may inform the BS of the size and period of the SID frame in the service flow parameters provided in a DSA (dynamic services addition) procedure, e.g., where the MS provides the size and period of the SID frame (and possibly other parameters) via a DSA-REQ (DSA request message or frame), or via a DSA-REQ/RSP (DSA request and response) exchange between MS and BS, as an example. Similarly, the MS may inform the BS of the size and period of the resource for transmission of (e.g., VoIP) voice data, which may be a different size and period used to transmit the SID frame. For example, a VoIP voice data transmission may be approximately 35-45 bytes, whereas the size of the SID frame may be only 4 bytes, for example. Other sizes may be used, as this is merely used to illustrate how the sizes of voice data and SID frame may be different.

In an example embodiment, the BS may allocate periodic resources to the MS for the transmission of (e.g., VoIP) voice data when the MS is in a non-silence period, that is, when the MS is active or transmitting and receiving data. According to an example embodiment, the BS may modify or adjust the allocated resources from resources for the voice data to resources for SID frames when the MS is in a silence period. The MS may send signals (e.g., start of silence CQICH codeword and end of silence codeword) to the BS to indicate when the MS is starting and ending the silence period, for example. The BS may modify or adjust the allocating of the resources between voice data resources and SID frame resources, based on whether or not the MS is in a silence period or not.

For example, a BS may initially allocate periodic UL resources to the MS for the transmission of VoIP voice data, e.g., such periodic resources having a size and period to accommodate or match the periodic transmission of voice data. Upon the BS receiving an indication that the MS in starting a silence period (and thus, the MS will not be transmitting voice data during such silence period, but the MS may transmit SID frames during the silence period to allow the other station to generate comfort noise), the BS may adjust the allocating of resources from a size and period for the voice data to a size and period of resource for the SID frame. At the end of the silence period for the MS, the BS may receive from the MS an indication of the end of the silence period, and the BS may then re-adjust the allocating of periodic resources from a size and period of the SID frame to a size and period of the (e.g., VoIP) voice data, for example, since the MS may begin transmitting voice data again (because the silence period for the MS has ended). Both the size and period of the voice data and SID frame may be been previously communicated by the MS to the BS via a DSA procedure or other signaling, for example. Further examples and details are illustrated and described with respect to FIG. 5.

Figure 5:
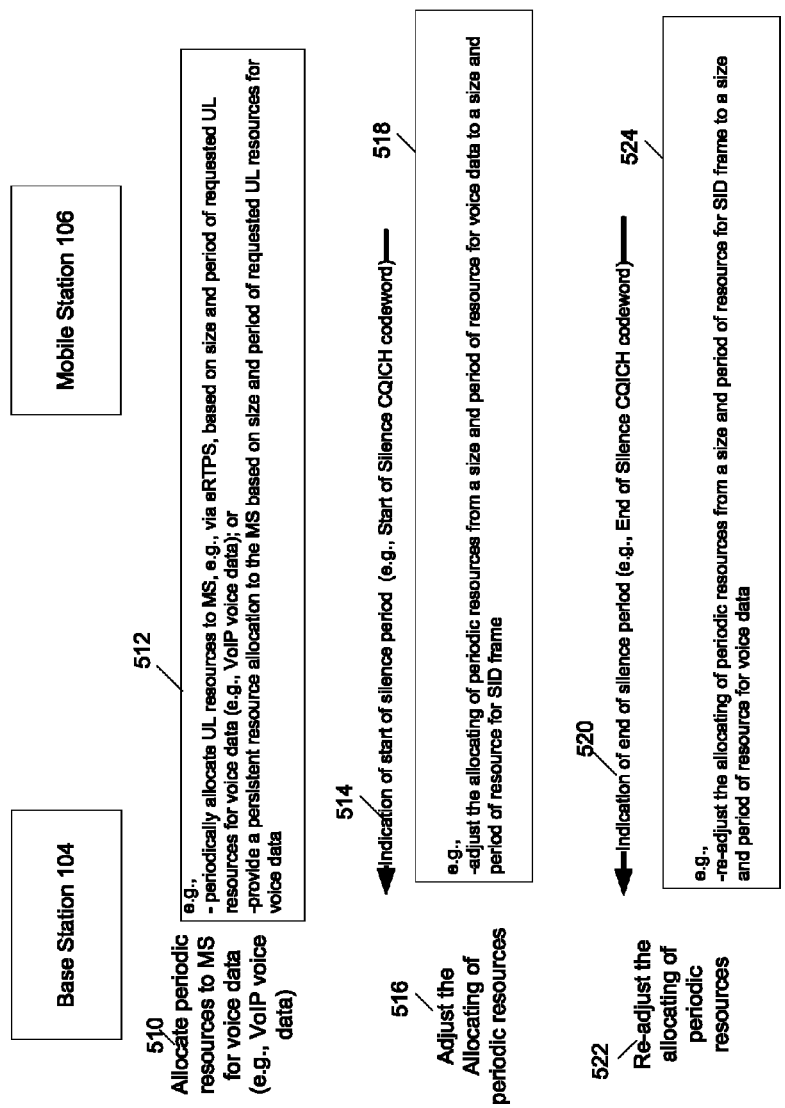
FIG. 5 is a timing diagram illustrating operation according to another example embodiment.

FIG. 5 is a timing diagram illustrating operation according to another example embodiment. At 510, the BS 104 may allocate periodic resources to the MS 106 for transmission of voice data, such as VoIP voice data as an example. At 512, operation 510 may include periodically allocating resources to the MS for the transmission of voice data, e.g., via eRTPS, such as by providing periodic UL grants, e.g., by transmitting one or more Map IEs to allocate resources to the MS (e.g., one Map IE transmitted to allocate UL resources for one frame, repeated at the specified period). At 512, operation 510 may alternatively include providing a persistent resource allocation to the MS based on a size and period of the requested UL resources, to allocate resources for the transmission of VoIP voice data.

In another example embodiment, the BS may receive voice data from the MS 106 via the allocated resources for voice data, and then may forward the voice data to a second station or VoIP endpoint.

At 514, the BS 104 may receive from the MS an indication of a start of silence period, such as, for example, a start of silence CQICH codeword, or other signal.

At 516, the BS 104 may adjust the allocating of the periodic resources. For example, at 518, operation 516 may include the BS 104 adjusting the allocating of the periodic resources from a size and period of resource for the voice data to a size and period of resource for a silence indication (SID) frame. For example, a voice data frame may be 40 bytes, while a SID frame may be 4 bytes, and these may have different periods. Thus, for example, in response to receiving a start of silence period indication, the BS may adjust the allocating of periodic resources from a larger voice data to a smaller SID frame. Thus, in this manner, periodic resources, previously used for (or allocated for) transmission of voice data, may be adjusted to accommodate the transmission of SID frames during a silence period, thereby conserving resources during the silence period, for example. This may free up resources that the BS may allocate for other purposes or to another station while the MS 106 is in a silence period, for example. For example, during a silence period, the MS may transmit one or more SID frames, while the MS may typically not transmit voice data during a silence period. For example, during the silence period, the BS 104 may receive a silence indication (SID) frame from MS 106, and may then forward the SID frame to a second station or other VoIP endpoint. The second station, upon receiving the SID frame, may then generate comfort noise, e.g., at an amplitude and for a time period indicated by the SID frame.

At 520, the BS receives an indication of an end of silence period, such as, for example, an end of silence CQICH codeword, or other signal or signaling. At 522, the BS 104 may re-adjust the allocating of periodic resources. For example, at 524, operation 522 may include re-adjusting the allocating the periodic resources from the size and period of resource for the SID frame to the size and period of resource for the VoIP voice data. The re-adjusting operation 524 may include, for example, transmitting a persistent IE (information element) to adjust or reallocate the persistent allocation from the silence indication (SID) frame to the voice data transmission. The new (or updated) persistent IE may indicate a size and period for the VoIP voice data. The resources allocated for persistent allocation for voice data during readjustment of allocating may be the same or different UL resources that were initially allocated to the MS at 512 for the transmission of voice data.

In another example embodiment, the BS may adjust an allocation of DL (downlink) periodic resources based on the BS detecting a start of silence period and/or end of silence period for the DL transmission to the MS. For example, a mobile station may be receiving, via periodic DL resources, voice data from another station via the BS. The BS may detect a start of silence period for DL transmission to the MS (e.g., the other station has entered a silence period). The BS may detect or determine a start of silence period for DL transmission to the MS, e.g., based on the size of the packet or frame received by the BS, since the BS may know (e.g., via DSA) the size and period of voice data/packet and size and period of SID frame/packet from the other station. Thus, the BS may detect an overall size of the packet to be forwarded to the MS, and that the size is now much smaller than voice packet (e.g., 4 byte SID frame size, rather than 35-45 bytes), and is approximately the size of SID frame, for example. Thus, receipt of a smaller size packet that is approximately the size of a SID frame may be interpreted by the BS as a start of silence period for DL transmission to the MS. Likewise, when the BS detects an increase of packet size, e.g., from 4 bytes (SID frame size) to 35-45 bytes (e.g., approx. size of voice data packet), then the BS may interpret this an indication of an end of silence period for DL transmission to the MS. Alternatively, the BS may receive signaling that indicates either start or end of silence period, for example.

In response to receiving an indication (e.g., based on size of received packet to be forwarded DL to MS or via signaling) of a start of silence period for a DL transmission, the BS may adjust the allocating of the periodic resources for DL transmission from a size and period of the voice data to a size and period of the SID frame. Similarly, after the BS receives an indication of an end of silence period for an end of silence period (e.g., based on size of packet to be forwarded DL to MS, or based on signaling), the BS may adjust the allocating of periodic resources for DL transmission from a size and period of SID frame back to size and period of voice data packet. This adjustment of periodic DL resource allocation may be provided via eRTPS or via persistent resource allocation. For example, upon receiving an indication of a start or end of silence period for the DL transmission, the BS may issue a persistent IE to the MS to indicate the new size and period, for the DL transmission to the MS.

According to another example embodiment, the size of the SID frame may be fixed or constant, but the period of the SID frame may be variable. Thus, in such case, during a silence period, it may not be possible for the BS to schedule UL resources for the transmission of one or more SID frames, since the period of SID frames (interval between SID frames) may vary or be variable (may be unknown to the BS). Therefore, according to an example embodiment, during a silence period for the MS, the BS may allocate to the MS a channel (or resource) that may be used by the MS to request UL resources for the transmission of SID frame. Thus, during the silence period, the MS may send a SID resource request CQICH codeword (as an example name of such request channel) to request UL resources to transmit a SID frame. In response to receiving such codeword or request, the BS may allocate resources for the MS to transmit a SID frame, where the size of resources for the SID frame may be fixed or known by the BS based on a DSA procedure or other previous signaling, for example. The MS may send the request for SID resources (e.g., a SID resource request CQICH codeword), e.g., at any time during silence period whenever it wants to send a SID frame.

According to another example embodiment, during the silence period, the BS may provide to the MS a resource request channel where the MS may request resources to transmit either a SID frame or VoIP voice data. For example, the resource request channel may be 1 bit, e.g., where the MS sends a first value (e.g., 0) to request allocation of UL resources for the MS to transmit voice data, and the MS sends a second value (e.g., 1) to request allocation of UL resources for the MS to transmit a SID frame. The MS may not send anything on this channel if the MS does not need to transmit SID or voice data. In an example embodiment, once the MS sends a request to transmit VoIP voice data, the BS may cease allocating the resource request channel, and may start allocating periodic resources for the voice data (e.g., VoIP voice data), as the MS is now transmitting voice data (silence period for MS has ended). For example, during a silence period, the BS may continue to allocate resources for the resource request channel so long as, e.g., silence period has not ended, or MS has not transmitted voice data, etc. In an example embodiment, he MS may use a HARQ (hybrid ARQ) channel as the resource request channel where only 1 bit of information is carried over the resource request channel.

In an example embodiment, each of the SID frames, at least in some cases, may have a same content or substantially similar content. The BS may receive, locally store (a copy of) the SID frame for later retrieval, and then forward the SID frame to the second station or VoIP endpoint for the VoIP call. Thus, e.g., after receipt of one or more SID frames from the MS, the BS may stop allocating UL resources to the MS for transmission of the SID frame (e.g., deallocate persistent IE or otherwise deallocate resources for SID frame), and may regenerate (e.g., retrieve from local memory) the SID frame for the MS, and may then forward the SID frame to the second station or VoIP endpoint based on the period for the SID frame, e.g., until the BS receives an indication of the end of silence period from the MS. The period of the SID frames may be known by the BS via a DSA procedure or other signaling (e.g., where SID frame period is constant or fixed), or may be determined by the BS measuring time period or interval between two or more received SID frames, for example. In this manner, by stopping the allocation of UL resources for the MS to transmit the SID frame and the BS locally generating and forwarding the SID frame, resources may be conserved.

Figure 6:
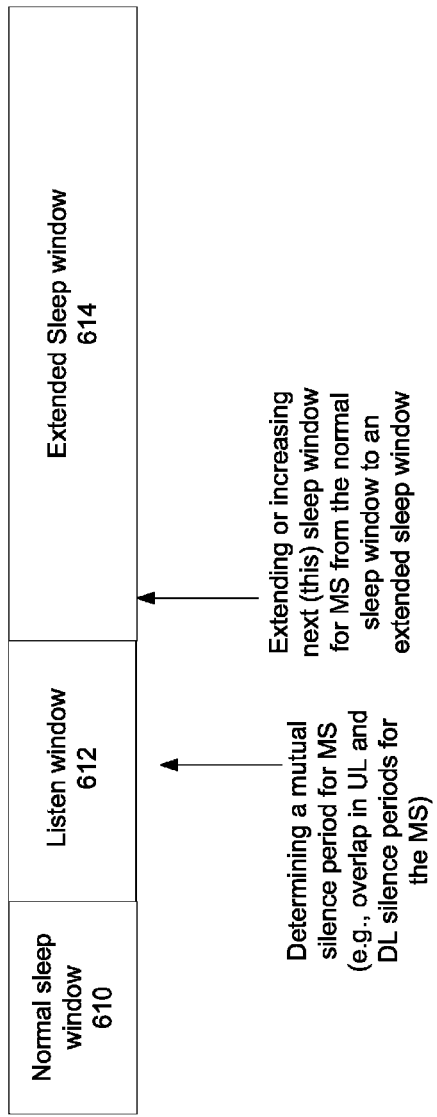
FIG. 6 is a diagram illustrating operation where a sleep window for a mobile station is increased or extended.

FIG. 6 is a diagram illustrating operation where a sleep window for a mobile station is increased or extended. A MS may, for example, alternate between a listen window where the MS may transmit and receive data, and a sleep window where one or more hardware components of the MS may be powered off to conserve power. As shown in FIG. 6, the MS may, for example, have a normal sleep window 610 of 15 ms every 20 ms. Thus, a MS may have a listen window 610 (e.g., of 5 ms), followed by a normal sleep window 612 (of e.g., 15 ms).

According to an example embodiment, a mutual silence period for a MS may be detected or determined (by either the MS or the BS), which may include overlapping UL and DL silence periods for the MS. This is where the MS is not transmitting voice data is not currently receiving voice data (e.g., because the other or second station may be in a silence period or sleeping). In such case, the next sleep window may be extended or increased, e.g., to an extended sleep window, e.g., 150 ms, or up to a length or period of the SID frames, or up to a maximum length of time that the BS can buffer packets or data for the MS, or other agreed maximum time period for an extended sleep window. Once the mutual silence period has been determined or detected, the MS may notify the BS that it is extending the next sleep window, or the BS (if it has detected the mutual silence period) may inform or instruct the MS to increase its next sleep window. For example, the MS 106 may know there is a DL silence period because MS 106 has received a start of silence indication or one or more SID frames from the second MS (e.g., forwarded by the BS), and the MS 106 knows that it has or will start its own silence period, as an example. Also, a BS may know that there may be a mutual (UL and DL) silence period since the BS may have received start of silence indications from both MSs, and not yet received end of silence indications, as an example.

Figure 7:
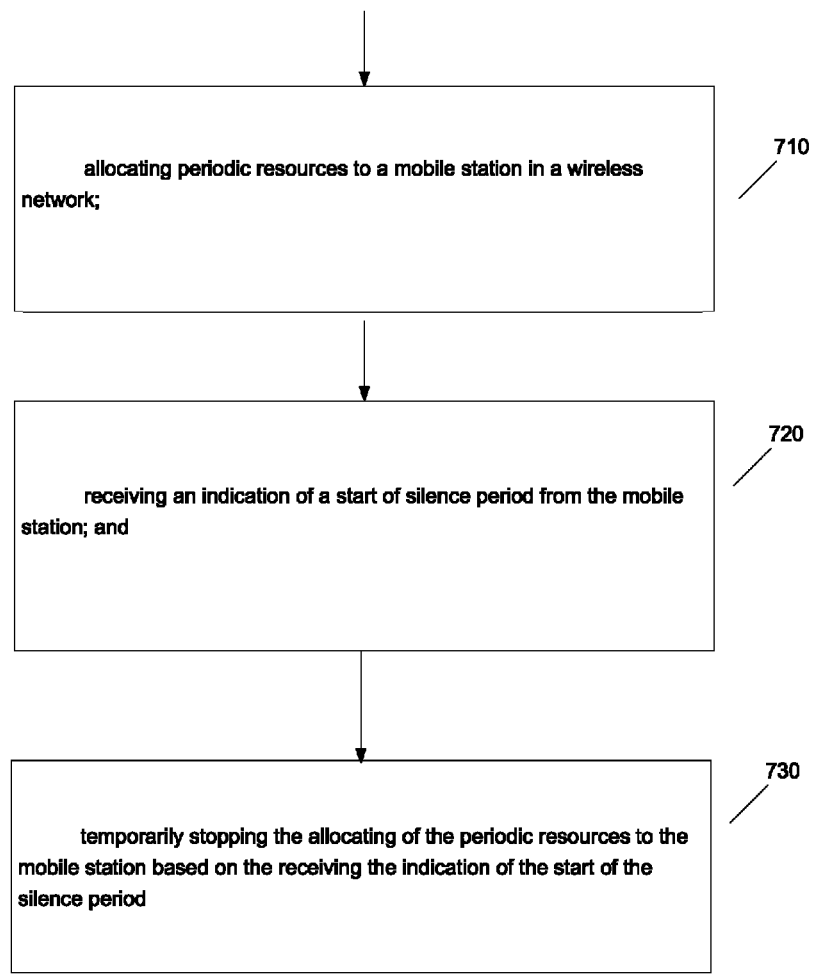
FIG. 7 is a flow chart illustrating operation of a base station (or other infrastructure node) according to an example embodiment.

FIG. 7 is a flow chart illustrating operation of a base station (or other infrastructure node) according to an example embodiment. Operation 710 may include allocating periodic resources to a mobile station in a wireless network. Operation 720 may include receiving an indication of a start of a silence period from the mobile station. Operation 730 may include temporarily stopping the allocating of the periodic resources to the mobile station based on the receiving the indication of the start of the silence period.

In an example embodiment, receiving operation 720 may include receiving a start of silence CQICH codeword from the mobile station that indicates the start of the silence period. This start of silence CQICH codeword may indicate to the BS that the MS is starting or entering a silence period in which no data (e.g., VoIP voice data) will be transmitted. However, during this silence period, the MS may transmit SID frames.

In an example embodiment, the flow chart of FIG. 7 may further include receiving an end of silence period indication (such as an end of silence period CQICH codeword) from the mobile station that indicates an end of the silence period, and restarting the allocating of the periodic resources to the mobile station based on receiving the end of the silence period indication. The indication of the end of the silence period may indicate to the BS that the silence period for the MS is ending (or has ended), and therefore, the MS may transmit VoIP voice data to the BS to be forwarded to the second station, and that the MS will typically not transmit SID frames during such non-silence period.

In an example embodiment, the allocating operation 710 may include, for example, periodically allocating uplink resources to the mobile station. In an example embodiment, the allocating operation 710 may include, for example, receiving, from the mobile station via a Dynamic Service Addition procedure, a period and length of a requested uplink resource allocation, and periodically allocating, via extended real time polling service (eRTPS), uplink resources to the mobile station for the transmission of voice data (such as VoIP voice data) based on the period and length of the requested uplink resource allocation.

In another example embodiment, the allocating operation 710 may include, for example, providing a persistent resource allocation to the mobile station that allocates recurring periodic resources to the mobile station for the transmission of voice over IP (VoIP) voice data. According to another example embodiment, an apparatus may include a controller, and a wireless transceiver. The apparatus may be configured to: allocate periodic resources to a mobile station in a wireless network, receive an indication of a start of a silence period from the mobile station, and temporarily stop allocating of the periodic resources to the mobile station based on receipt of the indication of a start of the silence period.

According to another example embodiment, an apparatus may include a controller, and a wireless transceiver. The apparatus may be configured to: allocate periodic resources to a mobile station in a wireless network for the transmission of voice data (such as VoIP voice data, for example); receive an indication of a start of silence period from the mobile station that indicates a start of a silence period; temporarily stop allocating of the periodic resources to the mobile station based on the receipt of the indication of the start of the silence period; receive an indication of an end of the silence period from the mobile station that indicates an end of the silence period; and restart the allocating of the periodic resources to the mobile station based on receipt of the indication of the end of the silence period.

In an example embodiment, the indication of the start of the silence period may include a start of silence channel quality information channel (CQICH) codeword or other signal (or other signal) from the mobile station, and wherein the indication of the end of the silence period may include an end of silence period channel quality information channel (CQICH) codeword or other signal.

In an example embodiment, the apparatus being configured to allocate periodic resources may include the apparatus being configured to periodically allocate, via extended real time polling service (eRTPS), uplink resources to the mobile station for the transmission of voice data.

In an example embodiment, the apparatus being configured to periodically allocate resources may include the apparatus being configured to periodically transmit to the mobile station a Map information element that allocates uplink resources to the mobile station for the transmission of voice data.

In an example embodiment, the apparatus being configured to allocate periodic resources may include the apparatus being configured to provide a persistent resource allocation to the mobile station that allocates recurring periodic resources to the mobile station for the transmission of voice over IP (VoIP) voice data.

In an example embodiment, the apparatus being configured to provide a persistent resource allocation to the mobile station may include the apparatus being configured to transmit to the mobile station a persistent information element (or persistent Map information element) that allocates recurring periodic resources to the mobile station for the transmission of voice data, such as for the transmission of voice over IP (VoIP) voice data, as an example.

Figure 8:
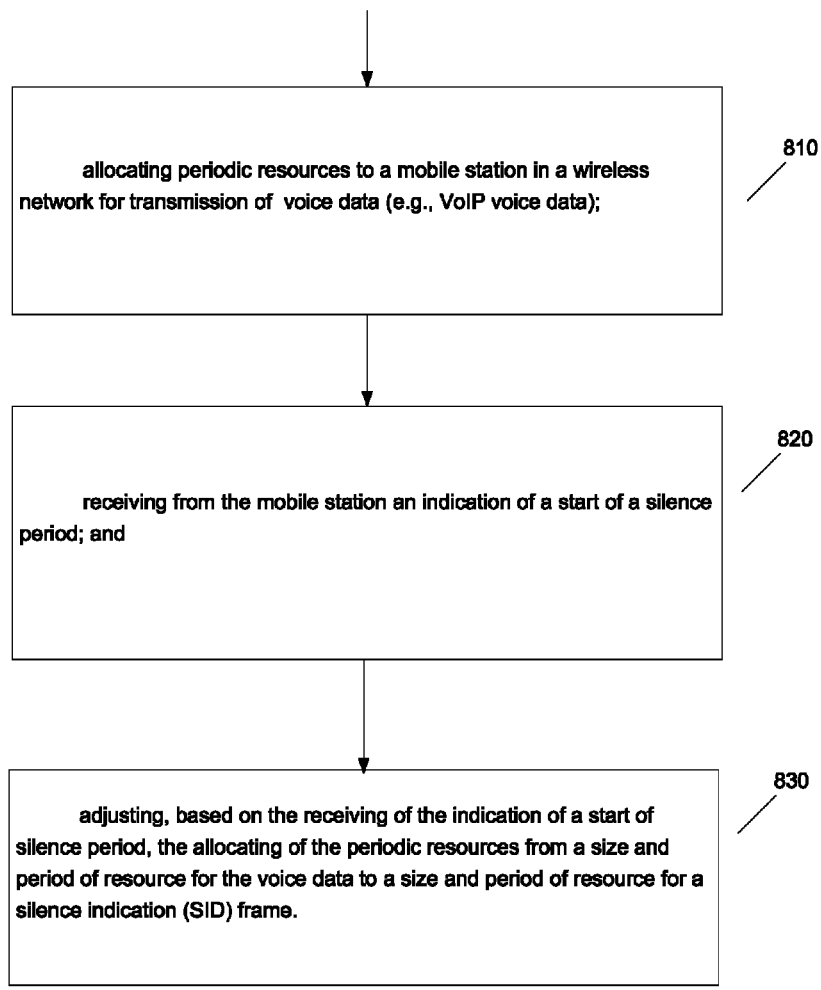
FIG. 8 is a flow chart illustrating operation of a base station according to an example embodiment.

FIG. 8 is a flow chart illustrating operation of a base station according to an example embodiment. Operation 810 may include allocating periodic resources to a mobile station in a wireless network for transmission of voice data (such as Voice over IP (VoIP) voice data as an example). Operation 820 may include receiving from the mobile station an indication of a start of a silence period. And, operation 830 may include adjusting, based on the receiving of the indication of a start of silence period, the allocating of the periodic resources from a size and period of resource for the voice data to a size and period of resource for a silence indication (SID) frame.

According to another example embodiment, the flow chart of FIG. 8 may further include receiving from the mobile station the size and period of the silence indication (SID) frame.

According to another example embodiment, the flow chart of FIG. 8 may further include receiving from the mobile station the size and period of the silence indication (SID) frame via a Dynamic Service Addition procedure or a Dynamic Service Change procedure, or other signal(ing).

According to an example embodiment, wherein the period of the silence indication (SID) frame is variable, the flow chart of FIG. 8 may further include receiving, from the mobile station, a channel quality information channel (CQICH)

codeword indicating a request for resources, the requested resources to be used by the mobile station to transmit the silence indication (SID) frame during the silence period.

The flow chart of FIG. 8 may further include allocating to the mobile station during the silence period a resource request channel, wherein receiving a first value from the mobile station via the resource request channel indicates a request for allocation of uplink resources for the mobile station to transmit voice data, and wherein receiving a second value from the mobile station via the resource request channel indicates a request for allocation of uplink resources for the mobile station to transmit a silence indication (SID) frame.

The flow chart of FIG. 8 may further include receiving a silence indication (SID) frame from the mobile station via the resources allocated for the SID frame, forwarding the received frame to a second station, the mobile station and the second station being associated with a VoIP connection, de-allocating the resources that were allocated to the mobile station for the SID frame, and regenerating and forwarding the SID frame to the second station based on the received SID frame and the period of the SID frame.

The flow chart of FIG. 8 may further include receiving voice data from the mobile station via the resources allocated for transmission of voice data, and forwarding the received voice data to a second station, the mobile station and the second station being associated with a VoIP connection or call connection.

In an example embodiment, the receiving operation 820 may include receiving a start of silence channel quality information channel (CQICH) codeword.

The flow chart of FIG. 8 may further include, after the adjusting operation 830, receiving a silence indication (SID) frame from the mobile station via the resources allocated for a silence indication (SID) frame, and forwarding the received silence indication frame to a second station, the mobile station and the second station being associated with a VoIP connection.

The flow chart of FIG. 8, wherein the allocating operation 810 may include periodically allocating, via extended real-time polling service (eRTPS), uplink resources to the mobile station for the transmission of the VoIP voice data.

The flow chart of FIG. 8, wherein the allocating operation 810 may include providing a persistent resource allocation to the mobile station that allocates recurring periodic resources to the mobile station for the transmission of voice data.

The flow chart of FIG. 8, wherein the allocating operation 810 may include transmitting to the mobile station, at a periodic interval for the voice data, a Map information element that allocates uplink resources of a size for the voice data; and wherein the adjusting operation 830 may include transmitting to the mobile station, at a periodic interval for the silence indication (SID) frame, a Map information element that allocates uplink resources of a size for the silence indication (SID) frame.

The flow chart of FIG. 8, wherein the allocating operation 810 may include providing a persistent resource allocation to the mobile station that allocates recurring periodic resources to the mobile station, the recurring resources having a size and period for the transmission of voice data; and wherein the adjusting operation 830 may include allocating of the periodic resources comprises adjusting the persistent resource allocation to provide a recurring resource to the mobile station having a size and period for the silence indication (SID) frame.

The flow chart of FIG. 8, wherein the adjusting operation 830 may include transmitting a persistent information element to reallocate the persistent allocation from the voice data transmission to the silence indication (SID) frame transmission.

The flow chart of FIG. 8, and further including receiving from the mobile station an indication of an end of the silence period; and re-adjusting, based on the receiving of the indication of the end of the silence period, the allocating of the periodic resources from the size and period of resource for the silence indication (SID) frame to the size and period of resource for voice data. In another example embodiment, the receiving from the mobile station an indication of an end of the silence period may include receiving an end of silence channel quality information channel (CQICH) codeword from the mobile station. In another example embodiment, the re-adjusting the allocating of the periodic resources may include transmitting a persistent information element to reallocate the persistent allocation from the silence indication (SID) frame transmission to the voice data transmission.

Figure 9:
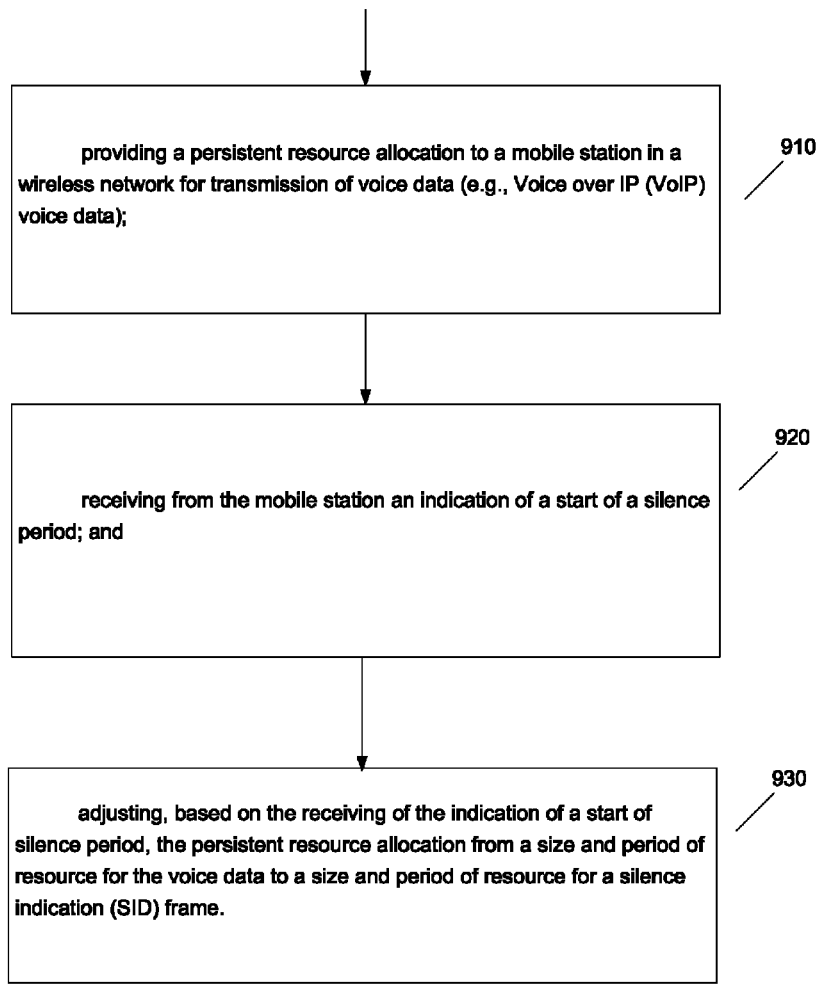
FIG. 9 is a flow chart illustrating operation of a base station according to another example embodiment.

FIG. 9 is a flow chart illustrating operation of a base station according to another example embodiment. Operation 910 may include providing a persistent resource allocation to a mobile station in a wireless network for transmission of voice data (e.g., VoIP voice data). Operation 920 may include receiving from the mobile station an indication of a start of a silence period. Operation 930 may include adjusting, based on the receiving of the indication of a start of silence period, the persistent resource allocation from a size and period of resource for the voice data to a size and period of resource for a silence indication (SID) frame.

According to another example embodiment, the flow chart of FIG. 9 may further include receiving from the mobile station the size and period of the silence indication (SID) frame.

According to another example embodiment, the flow chart of FIG. 9 may further include receiving from the mobile station the size and period of the silence indication (SID) frame via a Dynamic Service Addition procedure or a Dynamic Service Change procedure, or other signal(ing).

In an example embodiment, the providing operation 910 may include transmitting a persistent information element allocating a recurring periodic resource to the mobile station, the recurring periodic resource having a size and a period for the VoIP voice data.

The flow chart of FIG. 9 may further include receiving from the mobile station an indication of an end of the silence period; and re-adjusting, based on the receiving of the indication of the end of the silence period, the persistent resource allocation from the size and period of resource for the silence indication (SID) frame to the size and period of resource for the voice data.

According to another example embodiment, an apparatus may include a controller, and a wireless transceiver. The apparatus may be configured to: provide a persistent resource allocation to a mobile station in a wireless network for transmission of voice data (e.g., VoIP voice data); receive from the mobile station an indication of a start of a silence period; and adjust, based on the receiving of the indication of a start of silence period, the persistent resource allocation from a size and period of resource for the voice data to a size and period of resource for a silence indication (SID) frame. According to an example embodiment, the apparatus may be further configured to: receive from the mobile station an indication of an end of the silence period; and re-adjust, based on the receiving of the indication of the end of the silence period, the persistent resource allocation from the size and period of resource for the silence indication (SID) frame to the size and period of resource for the voice data. In an example embodiment, the apparatus may be further configured to: receive from the mobile station the size and period of the (e.g., VoIP) voice data (e.g., which may be based upon characteristics of the voice Codec used by the MS, for example), and receive from the mobile station the size and period of the silence indication (SID) frame. These may be transmitted or provided by the MS via signals or signaling, such as via a DSA or DSC procedure (s), as examples.

Figure 10:
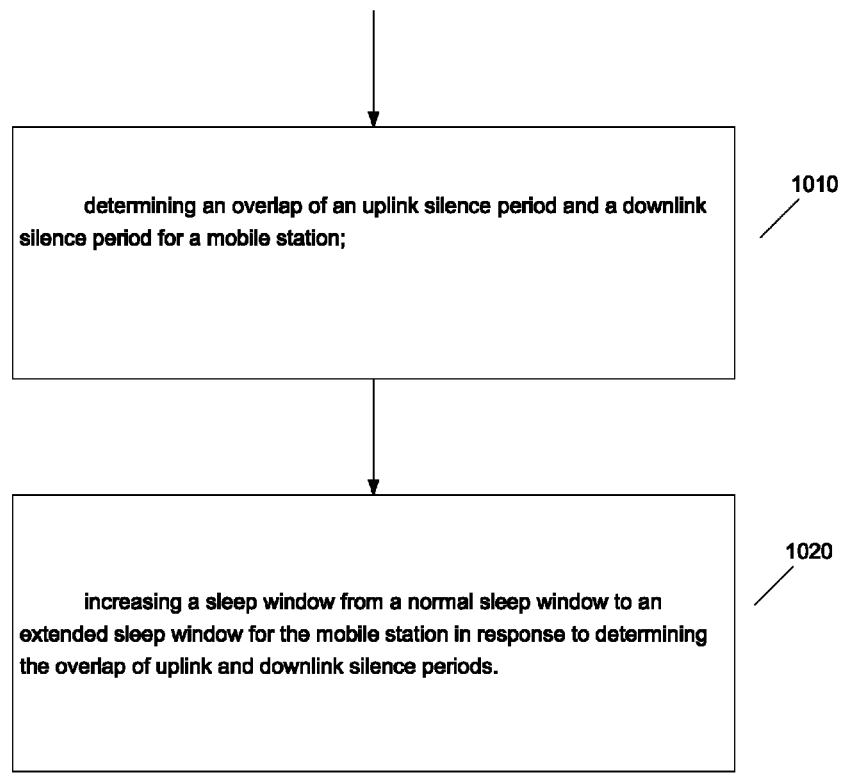
FIG. 10 is a flow chart illustrating operation of a wireless node according to an example embodiment.

FIG. 10 is a flow chart illustrating operation of a wireless node according to an example embodiment. Operation 1010 may include determining an overlap of an uplink silence period and a downlink silence period (which may be referred to as a mutual silence period) for a mobile station. Operation 1020 may include increasing a sleep window from a normal sleep window to an extended sleep window for the mobile station in response to determining the overlap of uplink and downlink silence periods.

In an example embodiment, the flow chart of FIG. 10 may further include determining an end of either the uplink silence period or the downlink silence period for the mobile station, and resetting the sleep window size for the mobile station to the normal sleep window in response to determining the end of either the uplink silence period or the downlink silence period. In another example embodiment, with respect to the flow chart of FIG. 10, the operation 1020 may include, for example, determining a size of the extended sleep window based on a period of a silence indication (SID) frame, and increasing the sleep window from a normal sleep window to an extended sleep window based on the determining the size of the extended sleep window. In this manner, the size of the extended sleep window may be determined based on the period or periodicity of the silence indication (SID) frame, for example.

VoIP is used herein merely as an example, and the disclosure is not limited thereto. The various embodiments may be applicable to a wide variety of networks/network types, protocols (including non-IP protocols), and applications (including non-VoIP applications) related to transmission of voice data.

Figure 11:
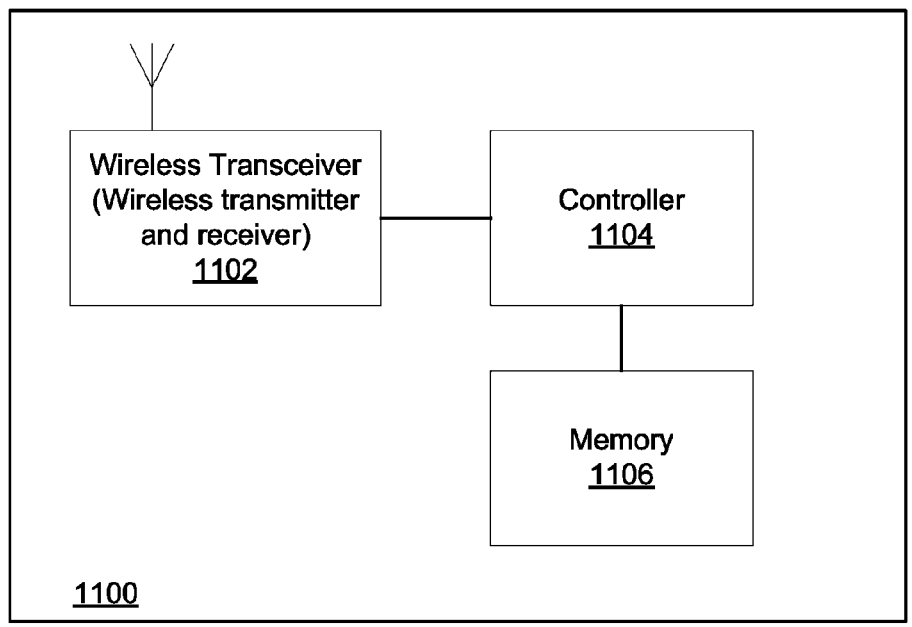
FIG. 11 is a block diagram of a wireless node according to an example embodiment.

FIG. 11 is a block diagram of a wireless station (or wireless node) 1100 according to an example embodiment. The wireless station 1100 (e.g., base station 104 or mobile node 106, 108, 110) may include, for example, a wireless transceiver (or wireless interface) 1102, including a transmitter to transmit signals and a receiver to receive signals, a controller 1104 to control operation of the station and execute instructions or software, and a memory 1106 to store data and/or instructions. Controller 1104 may also make decisions or determinations, generate frames or messages for transmission, decode received frames or messages for further processing, and other tasks or functions described herein.

Controller 1104 may be programmable and capable of executing software or other instructions stored in memory or on other computer media to perform the various tasks and functions described above, such as one or more of the tasks or methods described above.

In addition, a storage medium may be provided that includes stored instructions, which when executed by a controller or processor may result in the controller 1104, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program (s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
allocating periodic resources to a mobile station in a wireless network for transmission of voice data;
receiving from the mobile station an indication of a start of a silence period;
adjusting, based on the receiving of the indication of a start of silence period, the allocating of the periodic resources from a size and period of resource for the voice data to a size and period of resource for a silence indication (SID) frame;
receiving from the mobile station an indication of an end of the silence period; and
re-adjusting, based on the receiving of the indication of the end of the silence period, the allocating of the periodic resources from the size and period of resource for the silence indication (SID) frame to the size and period of resource for voice data, wherein the re-adjusting includes transmitting a persistent information element to reallocate persistent allocation from the silence indication (SID) frame transmission to the voice data transmission.

2. The method of claim 1 and further comprising receiving from the mobile station the size and period of the silence indication (SID) frame.

3. The method of claim 1 and further comprising receiving from the mobile station the size and period of the silence indication (SID) frame via a Dynamic Service Addition procedure or a Dynamic Service Change procedure.

4. The method of claim 1, wherein the period of the silence indication (SID) frame is variable, the method further comprising:
receiving, from the mobile station, a channel quality information channel (CQICH) codeword indicating a request for resources, the requested resources to be used by the mobile station to transmit the silence indication (SID) frame during the silence period.

5. The method of claim 1 and further comprising allocating to the mobile station during the silence period a resource request channel, wherein receiving a first value from the mobile station via the resource request channel indicates a request for allocation of uplink resources for the mobile station to transmit voice data, and wherein receiving a second value from the mobile station via the resource request channel indicates a request for allocation of uplink resources for the mobile station to transmit a silence indication (SID) frame.

6. The method of claim 1 and further comprising:
receiving voice data from the mobile station via the resources allocated for transmission of voice data; and
forwarding the received voice data to a second station, the mobile station and the second station being associated with a VoIP connection.

7. The method of claim 1 wherein the allocating periodic resources comprises periodically allocating, via extended real-time polling service (eRTPS), uplink resources to the mobile station for the transmission of VoIP voice data.

8. The method of claim 1 wherein the allocating periodic resources comprises providing a persistent resource allocation to the mobile station that allocates recurring periodic resources to the mobile station for the transmission of voice over IP (VoIP) voice data.

9. The method of claim 1:
wherein the allocating periodic resources for voice data comprises providing a persistent resource allocation to the mobile station that allocates recurring periodic resources to the mobile station, the recurring resources having a size and period for the transmission of voice over IP (VoIP) voice data; and
wherein the adjusting allocating of the periodic resources comprises adjusting the persistent resource allocation to provide a recurring resource to the mobile station having a size and period for the silence indication (SID) frame.

10. A method comprising:
allocating periodic resources to a mobile station in a wireless network for transmission of voice data;
receiving from the mobile station an indication of a start of a silence period;
adjusting, based on the receiving of the indication of a start of silence period, the allocating of the periodic resources from a size and period of resource for the voice data to a size and period of resource for a silence indication (SID) frame;
receiving a silence indication (SID) frame from the mobile station via the resources allocated for the SID frame;
forwarding the received frame to a second station, the mobile station and the second station being associated with a VoIP connection; and
de-allocating the resources that were allocated to the mobile station for the SID frame;
regenerating and forwarding the SID frame to the second station based on the received SID frame and the period of the SID frame.

* * * * *